United States Patent [19]

Deubzer et al.

[11] Patent Number: 4,552,910
[45] Date of Patent: Nov. 12, 1985

[54] AQUEOUS COMPOSITIONS CONTAINING AN ORGANOSILICON COMPOUND

[75] Inventors: Bernward Deubzer, Burghausen; Hermann Wilhelm, Braunau, both of Fed. Rep. of Germany

[73] Assignee: Wacker-Chemie GmbH, Munich, Fed. Rep. of Germany

[21] Appl. No.: 616,796

[22] Filed: Jun. 4, 1984

Related U.S. Application Data

[63] Continuation of Ser. No. 474,391, Mar. 11, 1983, abandoned.

[51] Int. Cl.⁴ .................. B01F 17/54; B01F 17/52; B01F 17/48; C09D 5/02
[52] U.S. Cl. ...................... 524/43; 524/265; 525/29
[58] Field of Search .......... 524/43, 265, 266; 106/169; 252/351; 525/29

[56] References Cited

U.S. PATENT DOCUMENTS

| | | | |
|---|---|---|---|
| 4,146,511 | 3/1979 | Moriya et al. | 524/265 |
| 4,309,319 | 1/1982 | Vaughn, Jr. | 106/193 J |
| 4,383,062 | 5/1983 | Saad et al. | 524/35 |
| 4,436,856 | 3/1984 | Huhn et al. | 524/211 |
| 4,461,854 | 7/1984 | Smith | 524/398 |

FOREIGN PATENT DOCUMENTS 1522244 8/1978 United Kingdom .

*Primary Examiner*—John Kight
*Assistant Examiner*—Nathan M. Nutter

[57] ABSTRACT

An aqueous organosilicon composition is prepared by mixing water with an organopolysiloxane having at least one

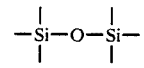

group and having aliphatic radicals which are bonded to silicon via oxygen, a polyvinyl alcohol and/or a water-soluble cellulose ether containing hydroxyl groups in the presence of sufficient acid to provide a composition having an acid pH. The resultant composition may be neutralized and used as additives in aqueous paint compositions.

6 Claims, No Drawings

AQUEOUS COMPOSITIONS CONTAINING AN ORGANOSILICON COMPOUND

This is a continuation, of application Ser. No. 474,391, filed Mar. 11, 1983 now abandoned.

The present invention relates to aqueous compositions, particularly to aqueous compositions containing organosilicon compounds and more particularly to aqueous emulsions containing organopolysiloxanes.

BACKGROUND OF THE INVENTION

Aqueous compositions which are obtained by mixing water with an organosilicon compound having aliphatic radicals which are bonded to silicon via oxygen and water-soluble cellulose ether in an acid medium are described in British Patent No. 1,522,244 to Dow Corning Limited. These compositions are prepared by mixing monoorganotrialkoxysilanes such as methyltrimethoxysilane with a water-soluble cellulose ether such as hydroxy ethyl cellulose in the presence of an acid.

The compositions prepared in accordance with British Pat. No. 1,522,244 are solutions, whereas the compositions of this invention are emulsions. Moreover, the compositions of this invention are substantially more stable in an acid, neutral or alkaline medium than the compositions described in the British patent. Also, the organosilicon compounds of this invention are not limited to SiC-bonded methyl, ethyl and vinyl radicals, but also include SiC-bonded phenyl and isooctyl radicals. Furthermore, the organopolysiloxanes employed in the compositions of this invention include not only monoorganosiloxane units, but also include diorganosiloxane units and triorganosiloxane units. The presence of the diorganosiloxane and triorganosiloxane units in the compositions of this invention results in coatings that are more flexible and elastomeric.

It is therefore an object of the present invention to provide an aqueous composition containing an organosilicon compound. Another object of the present invention is to provide an aqueous emulsion of organosilicon compounds. Still another object of the present invention is to provide an aqueous composition which can be converted to a flexible coating. A further object of the present invention is to provide a process for preparing an aqueous composition containing an organosilicon compound.

SUMMARY OF THE INVENTION

The foregoing objects and others which will become apparent from the following description are accomplished in accordance with this invention, generally speaking, by providing an aqueous composition comprising an organosilicon compound having at least one

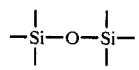

group and having aliphatic radicals bonded to silicon via oxygen, a polyvinyl alcohol and/or a water-soluble cellulose ether having hydroxyl groups, water and sufficient acid to provide a composition having an acid pH.

DESCRIPTION OF THE INVENTION

Any of the commercially available polyvinyl alcohols may be used in preparing the compositions of this invention. The commercially available polyvinyl alcohols are generally partially saponified polyvinyl acetates having a degree of hydrolysis of from about 79 to 99.5 mole percent, in which a 4 percent by weight aqueous solution has a viscosity of from 2 to 50 mPa.s at 20° C. The polyvinyl alcohol viscosities described herein are measured in a Hoeppler dropping ball viscosimeter.

The compositions of this invention may be prepared from only one type of polyvinyl alcohol or mixtures of various types of polyvinyl alcohols may be employed.

Any commercially available water-soluble cellulose ether containing hydroxyl groups may be used in the compositions of this invention. Preferably the water-soluble cellulose ethers are methylcellulose having an average methoxy content of from about 25 to 30 percent by weight and an average of from 200 to 1,000 glucose units per molecule; methylhydroxyethyl cellulose having an average methoxy content of from about 25 to 30 percent by weight and having an average of from 200 to 1,000 glucose units per molecule and sodium-carboxymethyl cellulose having from 7.5 to 9 percent by weight of bonded sodium and having from 150 to 1000 glucose units per molecule. The compositions may be prepared from only one type of cellulose ether or mixtures consisting of various types of cellulose ethers may, of course, be used in the preparation of the compositions of this invention.

The polyvinyl alcohol or cellulose ether or polyvinyl alcohol and cellulose ether is preferably used in an amount of from 1 to 15 percent by weight and preferably from 3 to 10 percent by weight, based on the weight of the organosilicon compound having aliphatic radicals bonded to silicon via oxygen, used in the preparation of the compositions of this invention.

The organosilicon compounds used in the preparation of the compositions of this invention are organosiloxanes having at least 2 silicon atoms and at least one siloxane-oxygen atom of the group

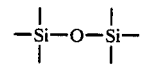

per molecule.

It is preferred that the organosiloxanes having aliphatic radicals which are bonded to silicon via oxygen have a viscosity of from 10 to 1000 mm².s$^{-1}$ at 25° C.

Preferably the organosiloxanes having aliphatic radicals which are bonded to silicon via oxygen contain from 10 to 40 mole percent of aliphatic radicals and that each of these radicals have from 1 to 4 carbon atoms.

Furthermore, it is preferred that the organosiloxanes having aliphatic radicals which are bonded to silicon via oxygen used in the preparation of the compositions of this invention contain at least 20 mole percent of monoorganosiloxane units and may even contain up to 100 mole percent of monoorganosiloxane units. The other siloxane units which may be present in the organosiloxanes used in the preparation of the compositions of this invention are preferably selected from the group consisting of diorganosiloxane units, triorganosiloxane units and units of the formulas $SiO_{4/2}$ and $$Si(OR')_aO_{\frac{4-a}{2}},$$

where a is 1, 2 or 3 and OR' represents the same or different aliphatic radicals which are bonded to silicon via oxygen.

The monoorganosiloxane units contained in the organosiloxane units having aliphatic radicals which are bonded to silicon via oxygen used in the preparation of the compositions of this invention can be represented by the general formula $$R\,Si(OR')_bO_{\frac{3-b}{2}},$$

wherein R represents the same or different SiC-bonded monovalent organic radicals, b is 0, 1 or 2 and OR' is the same as above.

The diorganosiloxane units contained in the organosiloxanes having aliphatic radicals which are bonded to silicon via oxygen used in the preparation of the compositions of this invention, can be represented by the general formula $$R_2Si(OR')_cO_{\frac{2-c}{2}},$$

where R and OR' are the same as above and c is 0 or 1.

Triorganosiloxane units can be represented by the following general formula $$R_3SiO_{1/2},$$

where R is the same as above.

It is preferred that the triorganosiloxane units and the siloxane units which are free of SiC-bonded organic radicals not exceed more than about 5 mole percent respectively.

Examples of monovalent organic radicals represented by R are straight chain or branched alkyl radicals such as the methyl, ethyl, n-propyl, isopropyl, n-butyl and sec-butyl radical, as well as octyl, dodecyl and octadecyl radicals; cycloalkyl radicals such as the cyclopentyl and the cyclohexyl radical; straight chain or branched alkenyl radicals such as the vinyl, the allyl and methallyl radicals; aryl radicals such as the phenyl radical; alkaryl radicals such as the tolyl radical; and aralkyl radicals such as the benzyl radical, as well as substituted hydrocarbon radicals such as halogenated hydrocarbon radicals. Examples of halogenated hydrocarbon radicals are the 3,3,3-trifluoropropyl radical, the chlorophenyl and dichlorophenyl radicals.

Examples of aliphatic radicals represented by R' are the methyl, ethyl, n-propyl, isopropyl, n-butyl, sec-butyl and the methoxy-ethylene radical, with the methyl and ethyl radicals being preferred.

Mixtures containing various types of organosiloxanes having aliphatic radicals which are bonded to silicon via oxygen may be used in the preparation of the compositions of this invention. However, it is also possible to use only one type of such organosiloxanes.

In addition to the organosiloxanes having aliphatic radicals which are bonded to silicon via oxygen, it is possible to use still other organic silicon compounds in the preparation of the compositions of this invention. Examples of such other organic silicon compounds are branched or linear organosiloxanes having Si-bonded hydroxyl groups, cyclic organopolysiloxanes with or without Si-bonded hydroxyl groups, and polyethyl silicates.

It is preferred that compositions of this invention be prepared in an acid medium, i.e., preferably at a pH of from 1 to 5, and more preferably at a pH of from 1 to 3. Any acid may be used to achieve the desired pH range, including mixtures of acids. Preferably, acids such as sulfonic acids and inorganic acids, such as hydrochloric acid or sulfuric acid may be used; however, the desired pH value can also be obtained with organic acids, such as acetic acid.

The compositions of this invention may be prepared by mixing the constituents in any sequence. For example, the silicon compounds containing at least one $$-\underset{|}{\overset{|}{Si}}-O-\underset{|}{\overset{|}{Si}}-$$

group, acid, polyvinyl alcohol and/or cellulose ether may be in the presence or absence of water. The organopolysiloxane having aliphatic radicals which are bonded to silicon via oxygen can be mixed, for example, with the acid, polyvinyl alcohol and/or cellulose ether and only a portion of the total amount of water to be used and then the remainder of the water may be added during or after the mixing process has been completed. Also, it is possible to add the organosiloxane having aliphatic radicals which are bonded to silicon via oxygen to an acid solution of polyvinyl alcohol and/or cellulose ether, or the polyvinyl alcohol, cellulose ether and water.

Preferably, the compositions of this invention are prepared in mixing devices which are suitable for the preparation of emulsions. Examples of such mixing devices are stator-rotor mixers and disc-type agitators operating at a high rate of speed. However, simple blade-type agitators may also be used.

It is preferred that the mixing take place at room temperature and at atmospheric pressure; however, higher or lower temperatures may also be used, if desired, and it is also possible to perform the mixing operation at pressures which are higher or lower than atmospheric pressure.

The mixing of the constituents of the compositions of this invention can be considered complete when a droplet of the mixture dries so as to form a continuous film when applied to a glass surface. At a pH of about 2, mixing will generally be completed between 30 and 60 minutes.

It is believed that a reaction occurs between the aliphatic radicals which are bonded to silicon via oxygen and the water, and the hydroxyl groups of the polyvinyl alcohol and/or the cellulose ether. Also, it has been found that when the organosiloxanes are mixed with the acid, polyvinyl alcohol and/or cellulose ether and water, the organosiloxanes increase in molecular weight.

When a droplet of the mixture dries to form a continuous film, it is preferred that the mixture be neutralized, i.e., the mixture may be adjusted to a pH of about 7. The neutralization can be accomplished with any base such as ammonia, amines, amine alcohols, such as for example, ethanolamine; calcium oxide, magnesium oxide or other acid-bonding materials, such as calcium carbonate.

It is preferred that the compositions of this invention be free of organic solvents, other than the alcohol liberated during the hydrolysis of the aliphatic radicals which are bonded to silicon via oxygen.

The compositions of this invention may, for example, be used as binding agents in aqueous paint compositions, which are applied as coatings, for example, to wood, masonry, metals, plastic materials or glass. Such aqueous paint compositions may contain any suitable pigments, including aluminum pigments. Also, the compositions of this invention can be used as primers for bonding organopolysiloxane elastomers to substrates. Furthermore, these compositions may be used as additives for organic dispersions and as additives for phenolic resin-bonded mineral insulation materials to impart hydrophobic properties thereto.

In the following examples, all parts and percentages are by weight unless otherwise specified.

EXAMPLE 1

About 250 parts of a partially hydrolyzed methyltriethoxysilane containing 40 mole percent of ethoxy groups and having a viscosity of 25 mm$^2$.s$^{-1}$ at 25° C., are mixed with 125 parts of a 10 percent aqueous solution of polyvinyl alcohol having a degree of hydrolysis which ranges from 86.0 to 89.0 mole percent, in which the unhydrolyzed groups are acetyl groups and a 4 percent by weight aqueous solution of the polyvinyl alcohol has a viscosity of 25±4 mPa.s at 20° C., (5 percent polyvinyl alcohol, based on the weight of the methylsiloxane containing ethyl radicals which are bonded to silicon via oxygen). The heterogeneous mixture thus obtained is mixed in a stator-rotor mixer (identified as "Ultra-Turrax") and converted into a homogeneous mixture. Then about 150 parts of water are added to the mixture over a period of about 5 minutes. The pH of the mixture is then adjusted to a pH of 2 by the addition of a 48 percent solution of sulfuric acid. The mixture is then agitated in the stator-rotor mixer for an additional 30 minutes and then a 25 percent aqueous ammonia solution is added to readjust the pH to 7.

EXAMPLE 2

The procedure described in Example 1 is repeated, except that the same amount of a partially hydrolyzed isooctyltrimethoxysilane is substituted for the partially hydrolyzed methyltriethoxysilane. The isooctyltrimethoxysilane contains 25 mole percent of methoxy groups and has a viscosity of 20 mm$^2$.s$^{-1}$ at 25° C.

EXAMPLE 3

The procedure described in Example 1 is repeated, except that the same quantity of a copolymer consisting of C$_6$H$_5$SiO$_{3/2}$ and (CH$_3$)$_2$SiO units in a molar ratio of 2:1 with 12 mole percent methoxy groups and 6 mole percent n-butoxy groups and having a viscosity of 125 mm$^2$.s$^{-1}$ at 25° C. is substituted for the partially hydrolyzed methyltriethoxysilane.

EXAMPLE 4

The procedure described in Example 1 is repeated, except that the same amount of a copolymer consisting of C$_6$H$_5$SiO$_{3/2}$ and CH$_3$SiO$_{3/2}$ units in a molar ratio of 1:1 with 35 mole percent methoxy groups and having a viscosity of 15 mm$^2$/.s$^{-1}$ is substituted for the partially hydrolyzed methyltriethoxysilane.

EXAMPLE 5

The procedure described in Example 1 is repeated, except that the same amount of an organosilicon composition consisting of equal parts by weight of the partially hydrolyzed methyltriethoxysilane described in Example 1, and a dimethylpolysiloxane having an Si-bonded hydroxyl group in each of its terminal units and a viscosity of 120 mm$^2$.s$^{-1}$ at 25° C. is substituted for the partially hydrolyzed methyltriethoxysilane.

All of the compositions prepared in accordance with Examples 1 through 5 are storage-stable and when dried, form continuous films which display high mechanical resistance.

EXAMPLE 6

About 1470 parts of the partially hydrolyzed methyltriethoxysilane described in Example 1 are added to a solution containing 30 parts of a methylhydroxyethylcellulose having an average methoxy content of approximately 25 percent and having an average of 600 glucose units per molecule in 1500 parts of water.

The mixture is then stirred with a simple blade agitator and mixed with 3.4 parts of a 48 percent sulfuric acid. After agitating for an additional 4 hours, the pH value of the mixture is adjusted to about 7 by the addition of 25 percent aqueous ammonia.

A sample of the resultant emulsion is then centrifuged for 1 hour at 4000 rpm. No separation between the aqueous phase and the organopolysiloxane phase is observed.

After the emulsion has been stored at room temperature for 4 weeks, no change in the emulsion can be detected.

COMPARISON EXAMPLE (a)

The procedure described in Example 6 is repeated, except that 1470 parts of methyltriethoxysilane are substituted for the partially hydrolyzed methyltriethoxysilane.

An essentially clear solution is first obtained and after a few hours the solution becomes milky white. After storing for 48 hours at room temperature, the mixture gelled.

What is claimed is:

1. An aqueous composition which is obtained by mixing water with an organosilicon compound having at least one

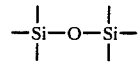

group per molecule and having aliphatic radicals selected from the group consisting of methyl, ethyl, propyl, isopropyl, n-butyl, sec-butyl and methoxy ethylene radicals bonded to silicon via oxygen, from 1 to 15 percent by weight based on the weight of the organosilicon compound of a compound selected from the group consisting of polyvinyl alcohol, a water soluble cellulose ether containing hydroxyl groups and mixtures thereof, and sufficient acid to provide a composition having a pH of from 1 to 5 and then subsequently neutralizing the composition.

2. The composition of claim 1, wherein the organosilicon compound having aliphatic radicals bonded to silicon via oxygen contains at least 20 mole percent of monoorganosiloxane units.

3. The composition of claim 1, wherein the resultant aqueous composition is then mixed for a period of time until a droplet of the composition forms a continuous film before it is neutralized with a base.

4. A process for preparing an aqueous composition which comprises mixing water with an organosilicon compound having at least one

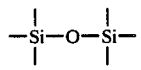

group per molecule and having aliphatic radicals selected from the group consisting of methyl, ethyl, propyl, isopropyl, n-butyl, sec-butyl and methoxy ethylene radicals bonded to silicon via oxygen, from 1 to 15 percent by weight based on the weight of the organosilicon compound of a compound selected from the group consisting of a polyvinyl alcohol, a water soluble cellulose ether containing hydroxyl groups and mixtures thereof and sufficient acid to provide a composition having a pH of from 1 to 5 and then subsequently neutralizing the composition.

5. The process of claim 1, wherein the organosilicon compound having aliphatic radicals bonded to silicon via oxygen contains at least 20 mole percent of monoorganosiloxane units.

6. The process of claim 4, wherein the resultant aqueous composition is then mixed for a period of time until a droplet of the composition forms a continuous film before it is neutralized with a base.

* * * * *